Jan. 28, 1969     A. BARNABY     3,424,323
VEHICLE LOADING RAMP
Filed Sept. 19, 1966
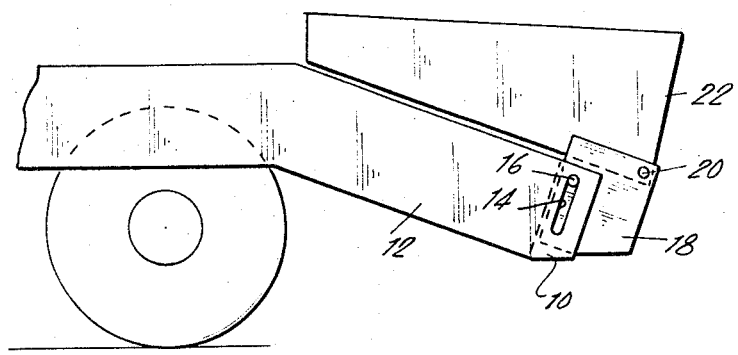
FIG. 1
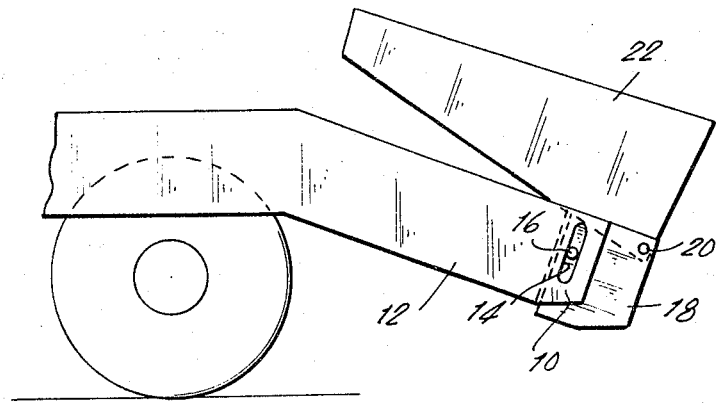
FIG. 2
FIG. 3
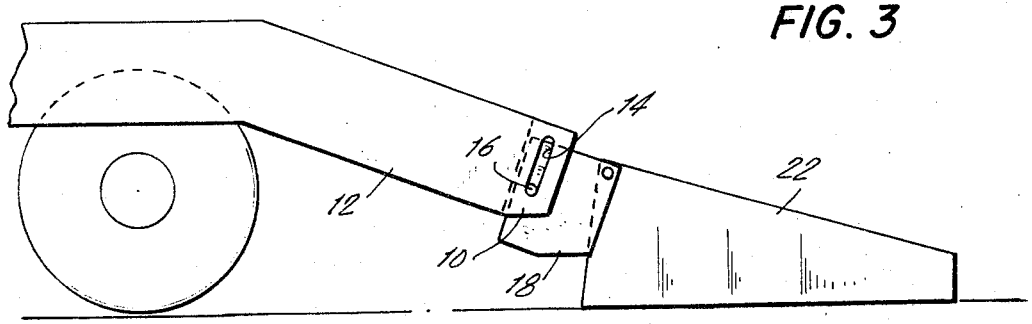
INVENTOR.
ALBERT BARNABY
BY Sidney Levy
AGENT United States Patent Office
3,424,323
Patented Jan. 28, 1969

3,424,323
VEHICLE LOADING RAMP
Albert Barnaby, 47 Lakeview Drive,
Gibbsboro, N.J. 08026
Filed Sept. 19, 1966, Ser. No. 580,851
U.S. Cl. 214—85      3 Claims
Int. Cl. B60p 1/00; B65g 11/00

ABSTRACT OF THE DISCLOSURE

A loading ramp assembly for a truck trailer or the like, comprising in combination a fixed plate disposed in a generally vertical plane, the fixed plate being connected to a rearward extremity of the trailer, the fixed plate being apertured to provide a generally vertical elongated slot, a movable plate, which movable plate is disposed in a generally vertical plane adjacent the fixed plate, a first pivotal connecting means in the form of a first pin extending generally horizontally through the movable plate and into the elongated slot in the fixed plate, a movable load-bearing ramp member, and second pivotal connected means in the form of a second pin extending generally horizontally through the movable plate and the ramp member.

---

This invention relates to load-bearing vehicles. In particular, this invention relates to an improved rear-end loading ramp adapted to facilitate the loading and unloading of heavy self-propelled vehicles, such as tractors, tanks and the like, on flat-bed truck trailer bodies and the like.

In the transportation of heavy equipment, such as tractors, military tanks, road surfacing equipment, bulldozers and the like from job to job, it is customary to load such items of equipment onto a flat-bed truck trailer, rather than to transport them from place to place under their own power. This mode of transportation is usually necessitated by the fact that most embodiments of such heavy equipment are designed to exert great forces at rather low speeds, and even when provided with variable gear ratios are generally incapable of moving from job to job economically at highway speeds. Also, such equipment is frequently provided with traction gear such as continuous tracks with outwardly extending flanges or blades, or similar traction gear adapted to assist the movement of the equipment under adverse conditions, as in soft sand, mud, and the like. Such types of traction gear, coupled with the great weight usually associated with such equipment, are extremely damaging to highway surfaces over which they may be driven. Consequently, it is usual to transport such equipment from job to job not under its own power, but rather by loading it on a flat-bed truck trailer or the like.

In order to load such a vehicle or piece of equipment onto a flat-bed trailer, it is necessary to provide some means of elevating the vehicle from the level of the roadbed to that of the trailer deck, and this is normally done by providing a loading ramp extending from the rear end of the trailer down to the roadbed, so that the vehicle to be transported may be simply driven up the ramp onto the deck of the trailer. Such a loading ramp may be very simple, and improvised on the site, for example, an array of heavy planks or the like. To facilitate loading and unloading under adverse conditions, however, or when suitable materials for improvisation may not be available, it has become customary to provide permanent loading ramps which may be integral with the transporting vehicle or may be carried thereon, available for use when needed.

Such permanent ramps, whether integral with the carrier or merely carried thereon, have been successful in a variety of applications and have gained wide acceptance. They suffer, however, from certain disadvantages. In particular, most of the loading ramps heretofore proposed have been designed to provide a smooth path from the roadbed level to the trailer deck level, based on the assumption that the underlying ground is level, i.e., that the roadbed or ground surface upon which the ramp rests is level, and at the same level as the level of the rear wheels of the trailer. Obviously, such is not always the case, and when the ground level under the loading ramp is different from that under the trailer wheels, or when the plane of the subjacent surface underlying the ramp is transversely tilted or slanted with respect to the surface underlying the wheels, excessive strains may be placed on the loading ramp and associated equipment and/or the equipment being loaded on the trailer may be subjected to dangerous side-to-side tilting, with concomitant danger of being thrown over on its side.

Such loading ramps as have been proposed in the effort to overcome these difficulties have in general been of rather complicated and expensive construction, and have been only partially successful for that reason, among others An object of this invention, therefore, is to provide an improved loading ramp for a load-carrying vehicle.

Another object is to provide a loading ramp effective to compensate for differences in level between the subjacent surface underlying the wheels of the load-carrying vehicle and that underlying the ramp.

Still another object is to provide a loading ramp of simple and inexpensive construction.

A feature of the invention is the use of the connecting plate between the terminal portion or "beaver tail" of a flat-bed trailer body and a loading ramp associated therewith.

Another feature is the provision of a pivotal connection between a rearward portion of the connecting plate and a forward portion of the ramp.

Still another feature is the provision of a pivotal connection between a rearward portion of the truck deck and a forward portion of the connecting plate.

According to another feature of the invention, at least one of the pivotal connections between the connecting plate and the truck body or the loading ramp is in the form of a generally cylindrical pivot member and a cooperating aperture in the form of a generally vertical elongated slot, thereby providing limited freedom of vertical movement of said ramp with respect to said truck body.

Other objects, features and advantages will become apparent from the following more complete description and claims, and by reference to the accompanying drawings.

In one particularly desirable embodiment, this invention contemplates a loading ramp assembly for a truck trailer or the like, comprising in combination a fixed plate disposed in a general vertical plane, said fixed plate being connected to a rearward extremity of said trailer, said fixed plate being apertured to provide a generally vertical elongated slot, a movable plate, said movable plate being disposed in a generally vertical plane adjacent said fixed plate, first pivotal connecting means in the form of a first pin extending generally horizontally through said movable plate and into said elongated slot in said fixed plate, a movable load-bearing ramp member, and second pivotal connecting means in the form of a second pin extending generally horizontally through said movable plate and said ramp member.

Referring now to the drawings:

FIGURE 1 is a side elevation showing the ramp assembly in folded or closed position, with the load-bearing surface of the ramp member folded down in facing relationship to the rear portion of the trailer deck.

FIGURE 2 is a view similar to FIGURE 1, but showing the ramp assembly in partially unfolded or opened condition.

FIGURE 3 is a view similar to FIGURES 1 and 2, but showing the ramp assembly in fully unfolded or opened condition, ready for use.

As shown in the drawings, the assembly comprises a fixed plate 10 welded or otherwise suitably secured to the rear end of the trailer deck 12. The fixed plate is apertured to provide an elongated, generally vertical slot 14, into which projects a first connecting pin 16. Pin 16, in turn, passes horizontally through movable plate 18, or may be made integral therewith, if desired. In this connection, it should be understood that there will normally be a pair of fixed plates and a pair of movable plates, one at either side of the trailer deck, and in this case the pin 16 may suitably be a member such as a one-inch diameter round steel bar extending through both movable plates 18 and into both slots 14.

Also passing through plate 18 is a second connecting pin 20. Pin 20 connects movable plate 18 with ramp member 22, and may also be a one-inch round steel bar extending across the entire rear of the trailer.

The manner of operation of the ramp assembly is believed to be obvious from the drawings. In FIGURE 1 the ramp is in folded condition, as it normally would be during transport operations, and incidentally may also serve the purpose of a rear chock to hold the cargo in place. As the ramp is lifted up, as shown in FIGURE 2, movable plate 18 drops down until pin 16 occupies a position approximately midway in slot 14. Finally, as the ramp is lowered fully, it rests on the ground with the pin assuming an appropriate position in the slot, in this case, near the bottom thereof. If the ground level under the ramp were lower than that under the wheels, the weight of the load on the ramp would be transmitted through pin 16 to fixed plate 10 and thence to the springs or the tires, lowering the trailer deck sufficiently to make the necessary accommodation. If there is not sufficient resilience in the springs or the wheels to make such an accommodation, the front end of the ramp will remain partially off the ground, and the load will then be borne by pins 16 and 20, which are, therefore, made of heavy construction, as above noted.

On the other hand, if the ground under the ramp is higher than that under the wheels, pin 16 will merely assume a position somewhat higher in slot 14.

While this invention has been described in terms of certain preferred embodiments and illustrated by certain drawings, these are illustrative only, as many alternatives and equivalents will readily occur to those skilled in the art, without departing from the spirit or proper scope of the invention. The invention is, therefore, not to be construed as limited, except as set forth in the appended claims.

I claim:

1. A loading ramp assembly for a truck trailer or the like, comprising in combination a fixed plate disposed in a general vertical plane, said fixed plate being connected to a rearward extremity of said trailer, said fixed plate being apertured to provide a generally vertical elongated slot, a movable plate, said movable plate being disposed in a generally vertical plane adjacent said fixed plate, first pivotal connecting means in the form of a first pin extending generally horizontally through said movable plate and into said elongated slot of said fixed plate, a movable load-bearing ramp member, and second pivotal connecting means in the form of a second pin extending generally horizontally through said movable plate and said ramp member.

2. A loading ramp assembly according to claim 1, comprising in addition a second fixed plate disposed on the opposite side of said trailer as the first mentioned fixed plate forming a pair of fixed plates, a second movable plate disposed adjacent said second fixed plate and forming a pair of movable plates with the first mentioned movable plate, said ramp member being disposed intermediate said movable plates.

3. An assembly according to claim 2, wherein each of said pins is a bar extending across the rear of said trailer from one to the other of said movable plates.

References Cited

UNITED STATES PATENTS

| 2,436,467 | 2/1948 | Winter | 14—17 X |
| 2,751,615 | 6/1956 | Kelley | 14—71 |
| 3,138,272 | 6/1964 | Flowers | 214—85 |
| 3,280,414 | 10/1966 | Layne | 14—71 |

ALBERT J. MAKAY, Primary Examiner.

U.S. Cl. X.R.

14—71